US012798380B2

(12) United States Patent
Weng et al.

(10) Patent No.: US 12,798,380 B2
(45) Date of Patent: Nov. 17, 2026

(54) AUTOMOTIVE DEVICE AND OPERATION METHOD THEREOF

(71) Applicant: CARUX TECHNOLOGY PTE. LTD., Singapore (SG)

(72) Inventors: Tsan-Po Weng, Tainan (TW); Yuan-San Hsiao, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 59 days.

(21) Appl. No.: 18/668,715

(22) Filed: May 20, 2024

(65) Prior Publication Data

US 2024/0424902 A1 Dec. 26, 2024

(30) Foreign Application Priority Data

Jun. 20, 2023 (CN) ......................... 202310735703.8

(51) Int. Cl.

| | |
|---|---|
| ***B60K 35/00*** | (2024.01) |
| ***B60K 35/22*** | (2024.01) |
| ***B60K 35/28*** | (2024.01) |
| ***B60K 35/29*** | (2024.01) |
| ***B60K 35/81*** | (2024.01) |

(52) U.S. Cl.

CPC .............. *B60K 35/29* (2024.01); *B60K 35/22* (2024.01); *B60K 35/28* (2024.01); *B60K 35/81* (2024.01); *B60K 2360/1434* (2024.01); *B60K 2360/176* (2024.01); *B60K 2360/195* (2024.01); *B60K 2360/21* (2024.01); *B60K 2360/583* (2024.01)

(58) Field of Classification Search

None

See application file for complete search history.

(56) References Cited

U.S. PATENT DOCUMENTS

| | | | | |
|---|---|---|---|---|
| 2006/0287826 | A1* | 12/2006 | Shimizu ............. | G01C 21/3602 701/431 |
| 2011/0193961 | A1* | 8/2011 | Peterson ................ | H04N 7/183 348/148 |
| 2014/0292694 | A1* | 10/2014 | Lin ....................... | G06F 3/0416 345/173 |
| 2018/0270542 | A1* | 9/2018 | Ramalingam ......... | B60W 50/14 |
| 2020/0279514 | A1* | 9/2020 | Lee ........................ | G06V 20/56 |
| 2020/0401818 | A1* | 12/2020 | Gibert Castroverde ..................... | B60K 35/10 |
| 2021/0162922 | A1* | 6/2021 | Camarero ............... | B60R 11/04 |
| 2022/0374127 | A1 | 11/2022 | Kwon | |
| 2024/0246412 | A1* | 7/2024 | Hanson, II ............. | B60K 35/81 |
| 2024/0414435 | A1* | 12/2024 | Yang ......................... | G06T 1/20 |
| 2025/0222880 | A1* | 7/2025 | Irie .......................... | G01C 3/18 |

FOREIGN PATENT DOCUMENTS

| | | | |
|---|---|---|---|
| CN | 115373540 | A | 11/2022 |
| TW | 201440028 | A | 10/2014 |

* cited by examiner

*Primary Examiner* — James M McPherson
(74) *Attorney, Agent, or Firm* — JCIPRNET

(57) ABSTRACT

An automotive device is provided. The automotive device includes a camera module and a display module. The display module receives a first boot signal to activate itself. The display module includes a first panel. A first chip is configured to receive a first image signal from the camera module and output a second image signal to the first panel.

19 Claims, 10 Drawing Sheets

AUTOMOTIVE DEVICE AND OPERATION METHOD THEREOF

CROSS REFERENCE TO RELATED APPLICATIONS

This application claims the benefit of China Patent Application No. 202310735703.8, filed Jun. 20, 2023, the entirety of which is incorporated by reference herein.

BACKGROUND OF THE DISCLOSURE

Field of the Disclosure

The application relates in general to an automotive device, and in particular, to an automotive device that can rapidly activate a display module.

Description of the Related Art

A rear-view mirror is a device that allows the driver of an automobile to see what is behind or on the sides of the vehicle. Since the viewing angle of a conventional rear-view mirror is limited, electronic rear-view mirrors have been developed, and have been used in vehicles in recent years. However, various aspects of current electronic rear-view mirrors can still be improved (for example, their activation time). Therefore, how to address the aforementioned problem has become an important issue.

BRIEF SUMMARY OF DISCLOSURE

An embodiment of the disclosure provides an automotive device, including a camera module and a display module. The display module receives a first boot signal to activate itself. The display module includes a first panel. A first chip is configured to receive a first image signal from the camera module, and to output a second image signal to the first panel.

An embodiment of the disclosure also provides an operation method of an automotive device, including: transmitting a first boot signal to a display module to activate the display module, transmitting a first image signal that is from a camera module to a first chip, using the first chip to output a second image signal to a first panel of the display module after the first chip receives the first image signal, and displaying an image on the first panel according to the second image signal.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSURE

Figure 1:
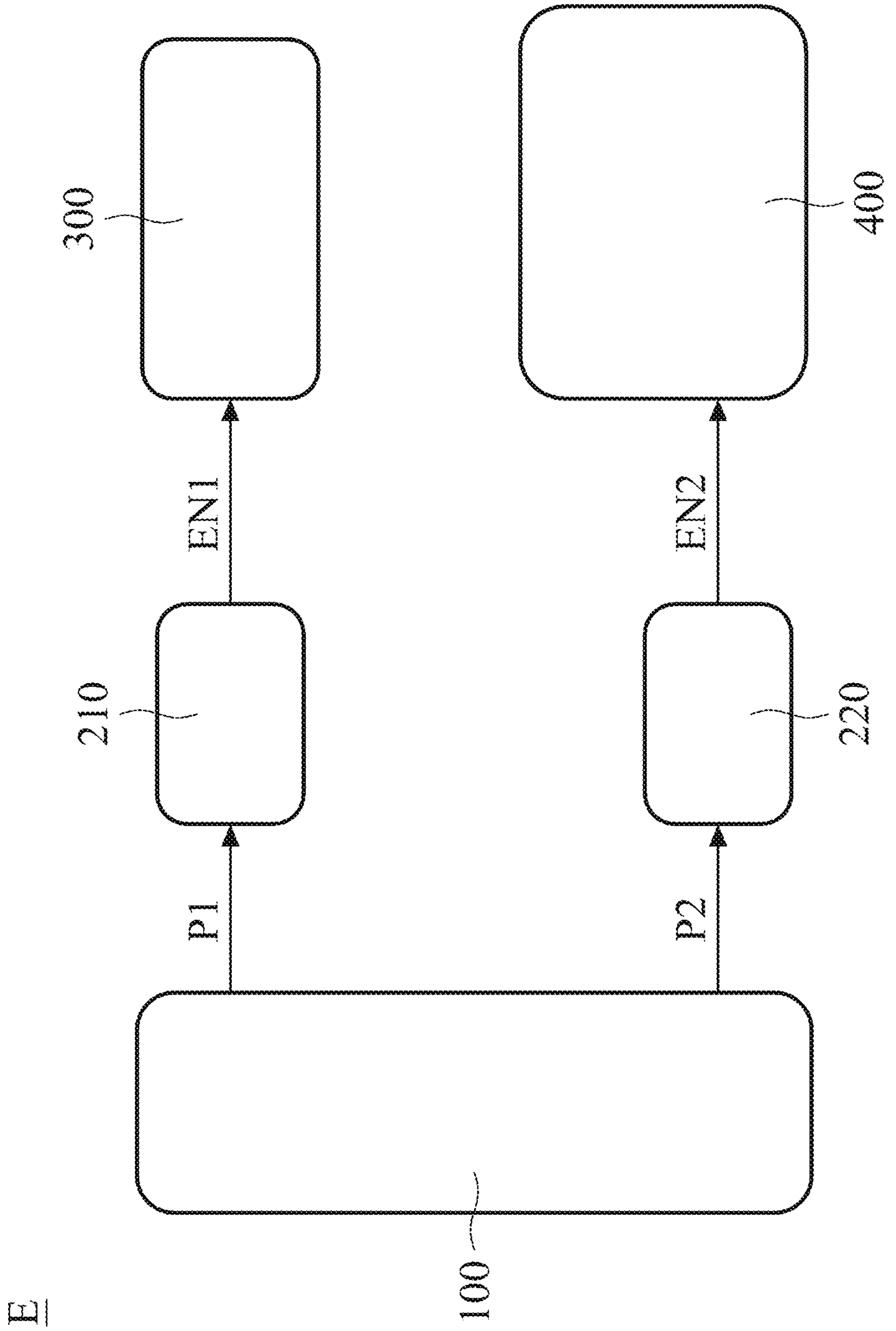
FIG. 1 is a schematic diagram of an automotive device according to an embodiment of the disclosure.

The making and using of the embodiments of the automotive device and the operation method thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

In some embodiments of the disclosure, terms concerning attachments, coupling and the like, such as "connected", refer to a relationship wherein structures are secured or attached to one another either directly or indirectly through intervening structures, unless expressly described otherwise.

It should be understood that, although the terms "first", "second", etc. can be used herein to describe various elements, layers and/or sections, these elements, layers and/or sections should not be limited by these terms. These terms are only used to distinguish one element layer or section from another element, layer or section. Thus, a first element, layer or section discussed below could be termed a second element, layer or section without departing from the teachings of the present disclosure. For brevity, the terms "first", "second", etc. may not be used in the specification. The first element and/or the second element in claims can refer to any element that meets the description in the specification without departing from the spirit and scope of the invention as defined by the appended claims.

The terms "about" and "substantially" typically mean +/−15% of the stated value, for example, +/−10%, +/−5%, +/−3%, +/−2%, +/−1%, or +/−0.5% of the stated value. The stated value of the present disclosure is an approximate value. When there is no specific description to the terms "about" and "substantially", the stated value includes the meaning of "about" or "substantially". Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise. Moreover, for brevity, some elements can be suitably omitted in the figures.

The automotive device can include a display device, a backlight device, an antenna device, a sensing device, a tiled device, or an in-vehicle device, but it is not limited thereto. The automotive device can be a bendable, flexible, or extendable electronic device. The shape of the electronic device can be a rectangle, a circle, a polygon, a shape with a curved edge or curved surface, or other suitable shape. The electronic device can includes an electronic module, such as a display module, a backlight module, an antenna module, a sensing module, or other suitable module. The display device can be a non-self-emitting type display device or a self-emitting type display device. The antenna device can be a liquid crystal type antenna device or a non-liquid crystal type antenna device, the sensing device can be a sensing device for sensing capacitance, light, heat, or ultrasonic, but it is not limited thereto. The electronic device can include a passive element and an active element, such as a capacitance, a resistance, an inductance, a diode, a transistor, or etc. The diode can include a light-emitting diode or a photoelectric diode. For example, the light-emitting diode can include an organic light-emitting diode (OLED), a mini LED, a micro LED, or a quantum dot LED, but it is not limited thereto. The tiled device can be a tiled display device or a tiled antenna device, but it is not limited thereto. Moreover, the electronic device can selectively include a peripheral system, including a driving system, a controlling system, a light source system, or etc., to support the display device, the antenna device, the sensing device, the tiled device, or the in-vehicle device. The electronic device can be applied on an instrument panel or a central control board of a vehicle, but it is not limited thereto. It should be noted that, the electronic device can be a combination having one or more aforementioned devices, but it is not limited thereto.

Referring to FIG. 1, an automotive device E in an embodiment of the disclosure includes a trigger unit 100, a first actuating unit 210, a second actuating unit 220, a display module 300, and an automotive host computer 400. For example, the trigger unit 100 can include a keyhole, a button, a switch, or a sensor, but it is not limited thereto. When the user activates the trigger unit 100 (such as unlocking the keyhole by the key, pushing the button, opening the switch, or let the corresponding sensing member moving adjacent to the sensor), the trigger unit 100 can transmit an opening signal P1 to the first actuating unit 210 and/or transmit an opening signal P2 to the second actuating unit 220. When the first actuating unit 210 and the second actuating unit 220 receive the opening signals P1 and P2 respectively, they can transmit a first boot signal EN1 and a second boot signal EN2 to the display module 300 and the automotive host computer 400 respectively to actuate the display module 300 and the automotive host computer 400. In some embodiments, the first boot signal EN1 and the second boot signal EN2 are output simultaneously through a synchronous circuit.

It should be noted that, the handling process of the display module 300 is simpler than that of the automotive host computer 400. Therefore, when the display module 300 and the automotive host computer 400 simultaneously receive the first boot signal EN1 and the second boot signal EN2, the display module 300 can be firstly actuated. In this embodiment, the display module 300 can include the electronic rear-view mirror, so that the user can watch the image on the electronic rear-view mirror before the vehicle is actuated. In some embodiment, the display module can be the combination of the electronic rear-view mirror and the center console, but it is not limited thereto.

Moreover, the trigger unit 100 can include a single trigger member (i.e. the keyhole, the button, the switch, or the sensor that is aforementioned before), or a plurality of trigger members. When the trigger unit 100 includes a single trigger member, the trigger unit 100 can transmit both the opening signal P1 and the opening signal P2 at the same time when the trigger unit 100 is activated. When the trigger unit 100 includes a plurality of trigger members, the user can activate the corresponding trigger member according to the requirement. For example, the user can merely activate the trigger member corresponding to the display module 300 without activating the trigger member corresponding to the automotive host computer 400.

Figure 2:
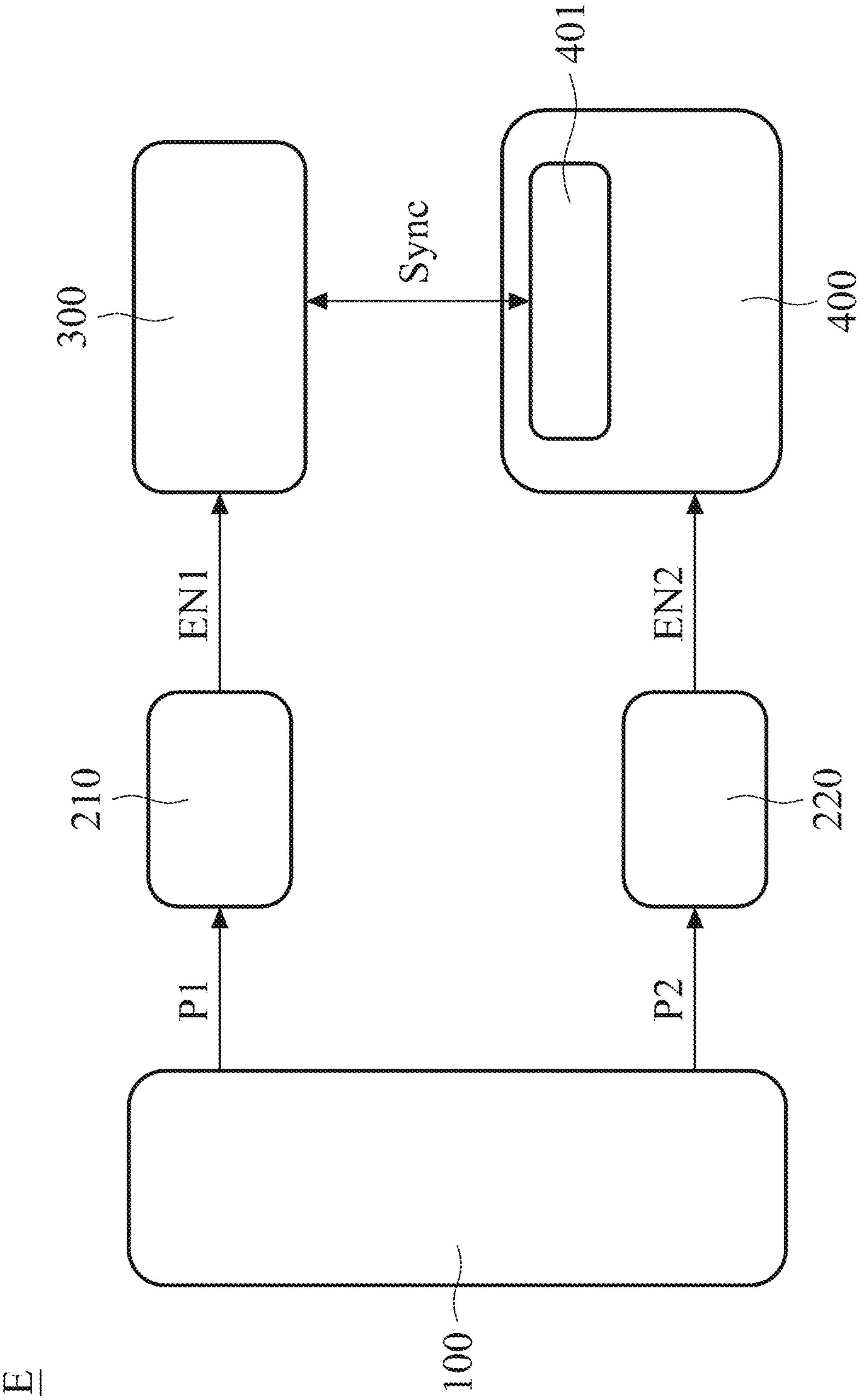
FIG. 2 is a schematic diagram of an automotive device according to an embodiment of the disclosure.

An automotive device E in FIG. 2 is similar to the automotive device E in FIG. 1. The difference between the automotive device E in FIG. 2 and the automotive device E in FIG. 1 is in that the automotive host computer 400 in FIG. 2 includes a synchronous matching circuit 401, so that the display module 300 and the automotive host computer 400 can synchronize (Sync) with each other. The timing of the display module 300 and the timing of the automotive host computer 400 can be matched, and the data can be transmitted therebetween.

Figure 3:
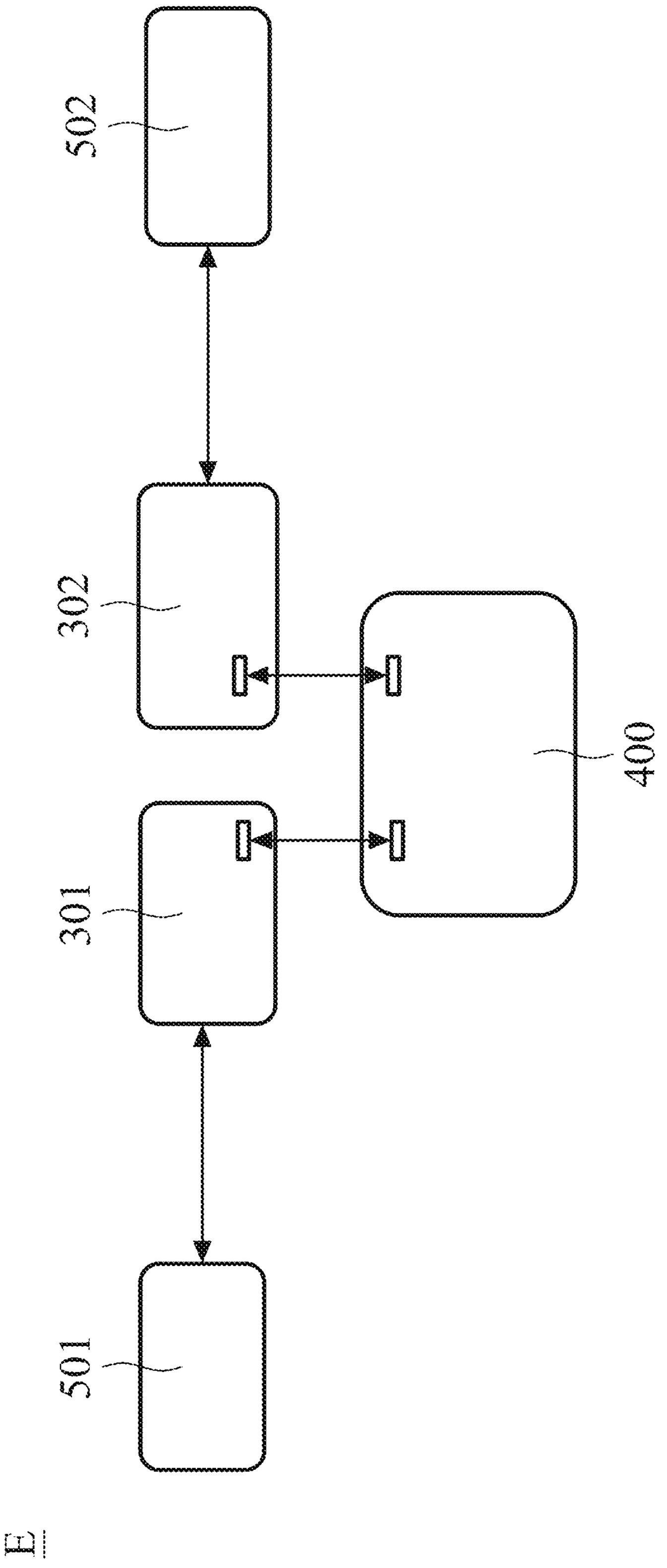
FIG. 3 is a schematic diagram of an automotive device according to an embodiment of the disclosure.

As shown in FIG. 3, in an embodiment of the disclosure, the automotive device E includes two display modules 301 and 302, an automotive host computer 400, and two camera modules 501 and 502. The display module 301 and the camera module 501 can be disposed on the left side of the vehicle, and the display module 302 and the camera module 502 can be disposed on the right side of the vehicle.

The camera module 501 can obtain the image on the left of the vehicle. After the aforementioned image is obtained, the camera module 501 can transmit an image signal (a first image signal) to the display module 301. The display module 301 can display according to the image signal. The camera module 502 can obtain the image on the right of the vehicle. After the aforementioned image is obtained, the camera module 502 can transmit an image signal (a third image signal) to the display module 302. The display module 302 can display according to the image signal. Each of the display module 301 and the display module 302 can be synchronized with the automotive host computer 400 via the busbar (such as the CAN (Controller Area Network) busbar or the SPI (Serial Peripheral Interface) busbar). Thus, the automotive host computer 400 can receive the signals from the display modules 301 and 302, and can transmit the instructions to control the display modules 301 and 302.

In some embodiments, the display module 301 and the display module 302 can be integrated into a single display module (such as the display module 300 shown in FIG. 4), but it is not limited thereto.

Figure 4:
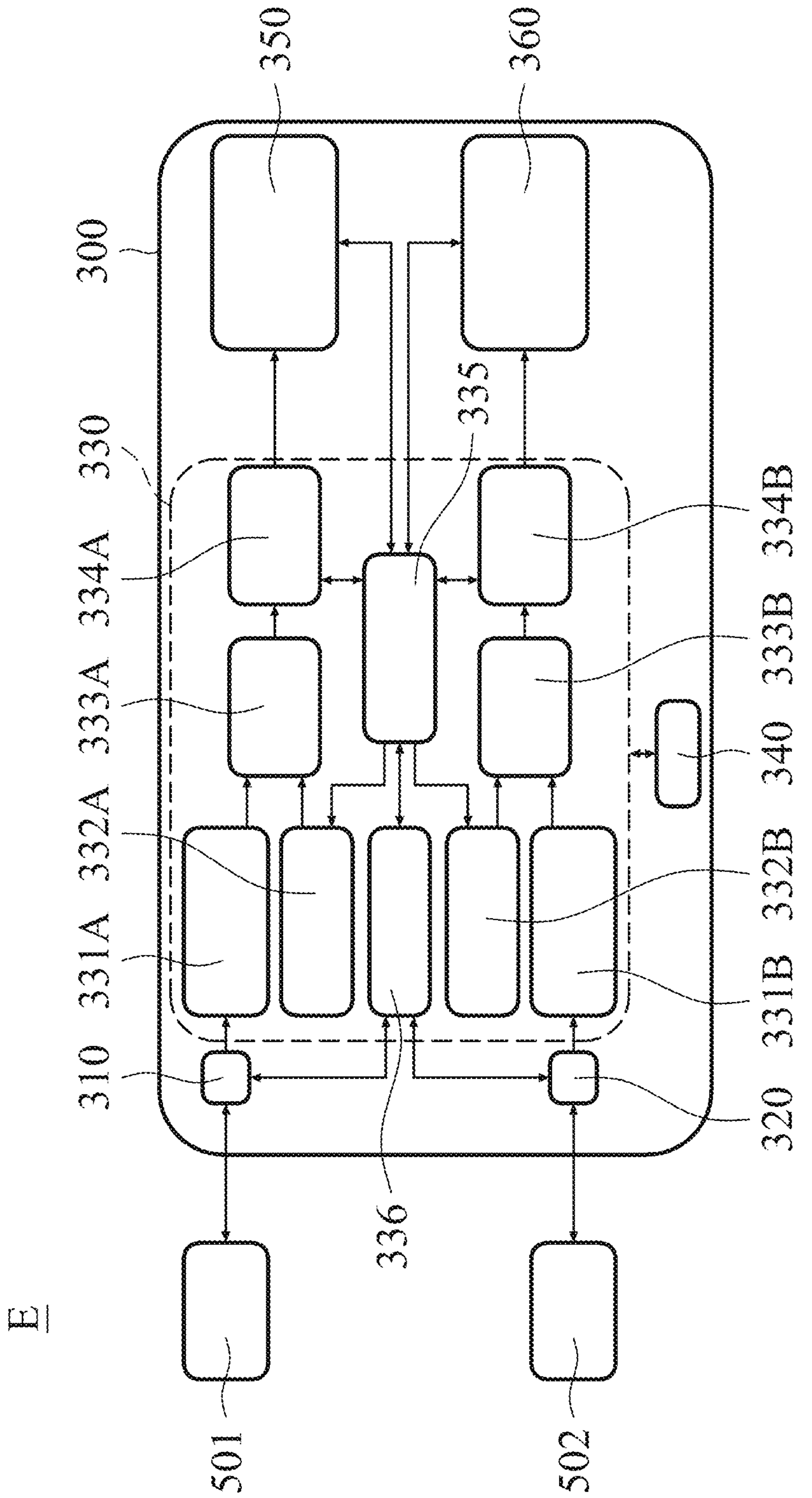
FIG. 4 is a schematic diagram of an automotive device according to an embodiment of the disclosure.

As shown in FIG. 4, in an embodiment of the disclosure, the automotive device E includes two camera modules 501 and 502 and a display module 300. The display module 300 includes a converter 310, a converter 320, a first chip 330, a memory 340, a first panel 350, and a second panel 360. The camera module 501 can transmit the obtained first image signal to the converter 310 of the display module 300. The converter 310 can transform the first image signal into a digital signal and transmit the digital signal to the first chip 330. After that, the first chip 330 can output a second image signal to the first panel 350. Similarly, the camera module 502 can transmit the obtained third image signal to the converter 320 of the display module 300. The converter 320 can transform the third image signal into a digital signal and transmit the digital signal to the first chip 330. After that, the first chip 330 can output a fourth image signal to the second panel 360. In some embodiments, each of the converters 310 and 320 can be a deserializer, but it is not limited thereto. In some embodiments, the first chip 330 can be an electronic control unit (ECU).

In detail, the first chip 330 can include receivers 331A and 331B, on-screen display (OSD) indicators 332A and 332B, image combiners 333A and 333B, timing controllers (Tcon) 334A and 334B, a touch controller 335, and a micro controller unit (MCU) 336.

The converter 310 can transmit the digital signal, which is transformed from the first image signal, to the receiver 331A. The converter 320 can transmit the digital signal, which is transformed from the third image signal, to the receiver 331B. The receivers 331A and 331B can transmit the aforementioned signals to the respective image combiners 333A and 333B. At the same time, the on-screen display indicators 332A and 332B can transmit the image signal of the on-screen display (such as a touch menu) to the respective image combiners 333A and 333B. The image combiners 333A and 333B can combine two signals and then transmit them to the timing controllers 334A and 334B, and finally to the first panel 350 and the second panel 360. Therefore, the first panel 350 can show the image captured by the camera modules 501 and the on-screen display simultaneously, and the second panel 360 can show the image captured by the camera modules 502 and the on-screen display simultaneously. In some embodiments, the first panel 350 and the second panel 360 can be two separated panels. In some embodiments, the first panel 350 and the second panel 360 can be two regions of the same panel, but it is not limited thereto.

In this embodiment, the first panel 350 and/or the second panel 360 can include touch function. When the user touches the first panel 350 and/or the second panel 360, the first panel 350 and/or the second panel 360 can transmit a touch signal to the touch controller 335. The touch controller 335 can control the on-screen display indicator 332A and/or the on-screen display indicator 332B according to the touch signal, and the on-screen display indicator 332A and/or the on-screen display indicator 332B can change the output on the on-screen display. Also, signal can be transmitted between the touch controller 335 and the timing controller 334A and/or between the touch controller 335 and the timing controller 334B, so that the timing controller 334A and/or the timing controller 334B can change the lightness or the color of the first panel 350 and/or the second panel 360, but it is not limited thereto.

The micro controller unit 336 can be electrically connected to the converter 310, the converter 320, and the touch controller 335 to control the converters 310 and 320 and the touch controller 335 or assist them to calculate. The memory 340 can be electrically connected to the first chip 330. The data of the first chip 330 can be temporarily stored in the memory 340.

In some embodiments, the converter 310 and/or the converter 320 can be integrated in the first chip 330, but it is not limited thereto. In some embodiments, the first chip 330 does not include the timing controller 334A and/or the timing controller 334B. In other words, the timing controller 334A and/or the timing controller 334B can be disposed in the position out of the first chip 330, but it is not limited thereto.

Figure 5:
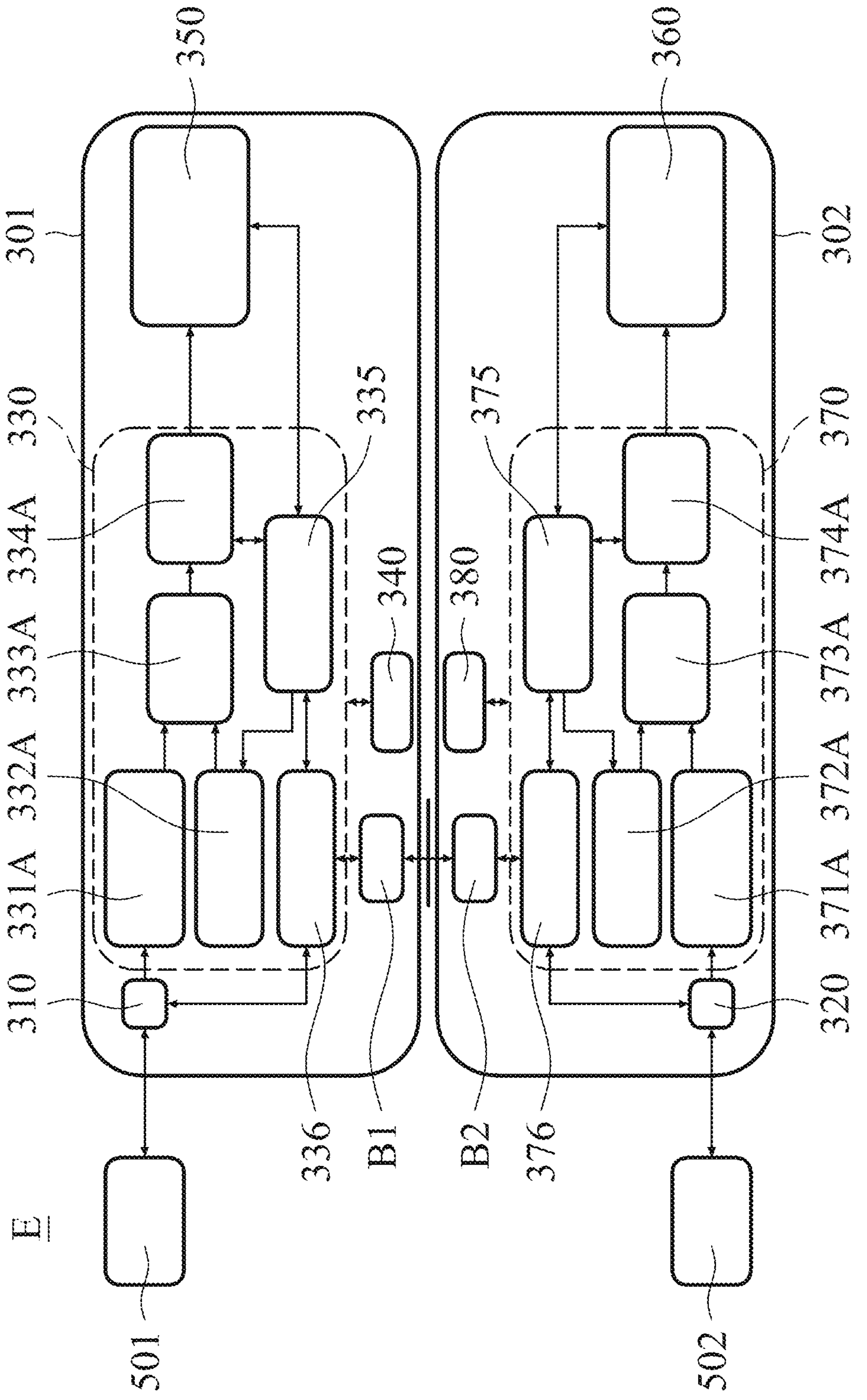
FIG. 5 is a schematic diagram of an automotive device according to an embodiment of the disclosure.

Referring to FIG. 5, in an embodiment of the disclosure, the automotive device E includes two camera modules 501 and 502 and two display modules 301 and 302. The display module 301 includes a converter 310, a first chip 330, a memory 340, a first panel 350, and a busbar B1. The display module 302 includes a converter 320, a second chip 370, a memory 380, a second panel 360, and a busbar B2. The camera modules 501 and 502 can respectively transmit the obtained first image signal and third image signal to the converters 310 and 320. The converters 310 and 320 can transform the first image signal and the third image signal into digital signals and respectively transmit them to the first chip 330 and the second chip 370. After that, the first chip 330 can output a second image signal to the first image panel 350, and the second chip 370 can output a fourth signal to the second panel 360. In some embodiments, each of the first chip 330 and the second chip 370 can be an electronic control unit (ECU).

The first chip 330 includes a receiver 331A, an on-screen display indicator 332A, an image combiner 333A, a timing controller 334A, a touch controller 335, and a micro controller unit 336. The second chip 370 includes a receiver 371A, an on-screen display indicator 372A, an image combiner 373A, a timing controller 374A, a touch controller 375, and a micro controller unit 376. The converters 310 and 320 can transmit the digital signals—those that were transformed from the first image signal and the third image signal—to the respective receivers 331A and 371A, and then the receivers 331A and 371A can transmit the aforementioned signals to the respective image combiners 333A and 373A. At the same time, the on-screen display indicators 332A and 372A can transmit the image signal of the on-screen display (such as the touch menu) to the respective image combiners 333A and 373A. The image combiners 333A and 373A can combine two signals and then transmit it to the timing controllers 334A and 374A, and finally transmit to the first panel 350 and the second panel 360. Therefore, the first panel 350 can show the image captured by the camera modules 501 and the on-screen display simultaneously, and the second panel 360 can show the image captured by the camera modules 502 and the on-screen display simultaneously.

The first panel 350 can include touch function. When the user touches the first panel 350, the first panel 350 can transmit a touch signal to the touch controller 335. The touch controller 335 can control the on-screen display indicator 332A according to the touch signal, and the on-screen display indicator 332A can change the output on the on-screen display. Also, signal can be transmitted between the touch controller 335 and the timing controller 334A, so that the timing controller 334A can change the lightness or the color of the first panel 350, but it is not limited thereto. The micro controller unit 336 can be electrically connected to the converter 310 and the touch controller 335 to control the converter 310 and the touch controller 335 or assist them to calculate. The memory 340 can be electrically connected to the first chip 330, and the data of the first chip 330 can be temporarily stored in the memory 340.

The second panel 360 can also include touch functionality. When the user touches the second panel 360, the operation in the second panel 360 is the same as the aforementioned operation in the first panel 350, so that the features thereof are not repeated in the interest of brevity.

The micro controller unit 336 of the first chip 330 and the micro controller unit 376 of the second chip 370 can transmit the signal and the data therebetween through the busbar B1 and the busbar B2.

Figure 6:
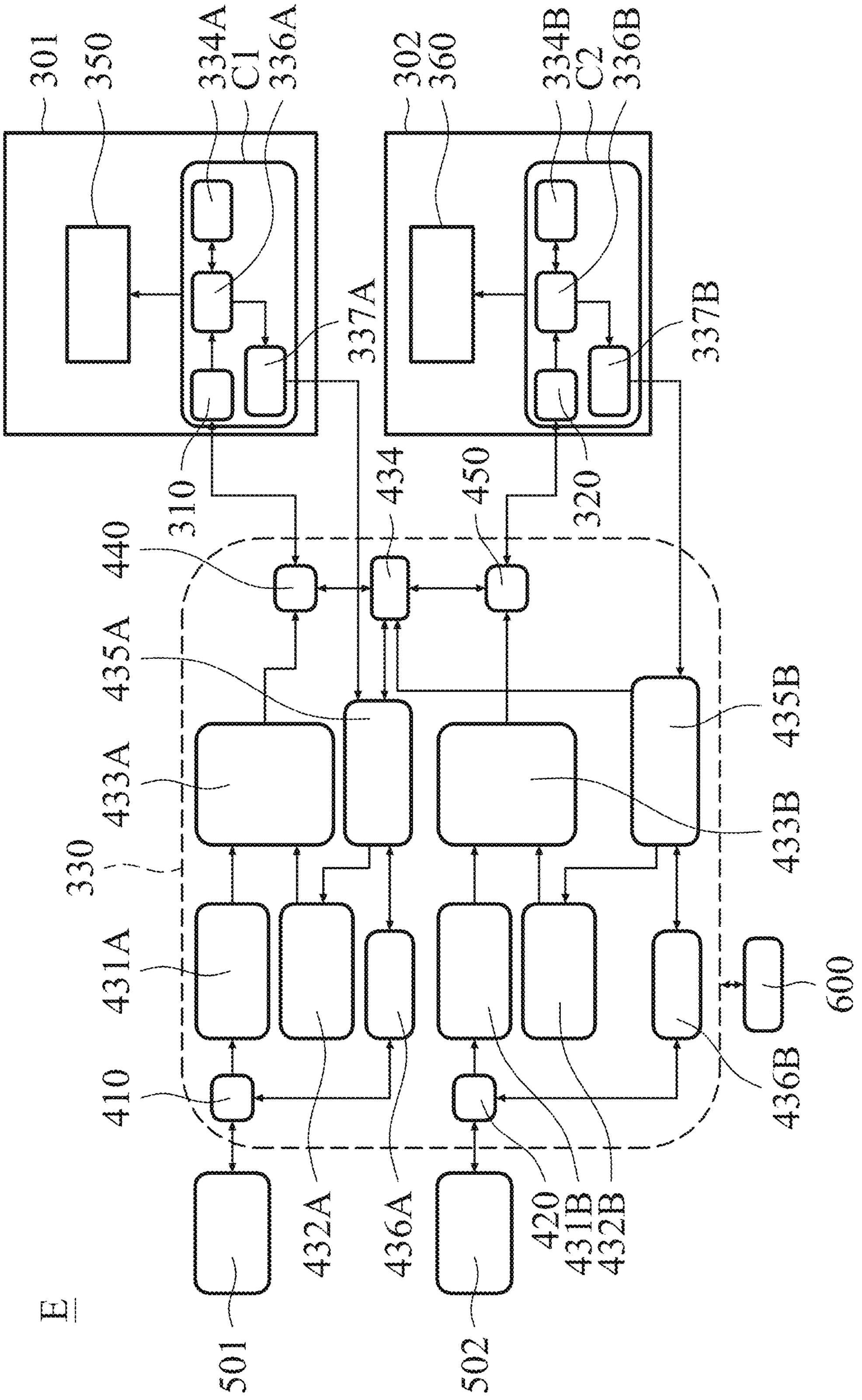
FIG. 6 is a schematic diagram of an automotive device according to an embodiment of the disclosure.

Referring to FIG. 6, in an embodiment of the disclosure, the automotive device E includes two camera modules 501 and 502, a first chip 330, a memory 600, and two display modules 301 and 302. The camera module 501 can transmit the obtained first image signal to the first chip 330 to process it. After the first image signal is processed, it can be transmitted to the display module 301. Similarly, the camera module 502 can transmit the obtained third image signal to the first chip 330 to process it. After the third image signal is processed, it can be transmitted to the display module 302.

The first chip 330 includes converters 410 and 420, receivers 431A and 431B, on-screen display indicators 432A and 432B, image combiners 433A and 433B, a timing controller 434, touch controllers 435A and 435B, micro controller units 436A and 436B, and converters 440 and 450. In some embodiments, the first chip 330 can be an in cabin driving system electronic control unit (ICDS ECU). In some embodiments, the first chip 330 can be configured to receive multiple signals (for example, image signals, touch signals, display signals, and/or timing signals, but it is not limited thereto), calculate or combine the multiple signals, and transmit the calculated or combined signal to the corresponding module or member. For example, the first chip 330 can receive the image signals from the camera module 501 and 502, and can combine the transformed image signals and the image signals from the on-screen display indicator 432A and 432B. After that, the display modules 301 and 302 can receive the image combine data which is processed by the first chip 330 and display on the first panel 350 and the second panel 360.

In particular, the first image signal and the third image signal respectively received by the camera modules 501 and 502 can transmitted to the converters 410 and 420, the converters 410 can transform the first image signal to the digital signal and transmit it to the receiver 431A, and the converters 420 can transform the third image signal to the digital signal and transmit it to the receiver 431B. Subsequently, the receivers 431A and 431B can respectively transmit the aforementioned signals to the image combiners 433A and 433B. At the same time, the on-screen display indicator 432A and 432B can transmit the image signal of the on-screen display (such as the touch menu) to the respective image combiners 433A and 433B. The image combiners 433A and 433B can combine two signals and then transmit it to the converters 440 and 450, and the converters 440 and 450 can transmit the signals to the display modules 301 and 302. In some embodiments, each of the converters 410 and 420 can be a deserializer, and each of the converters 440 and 450 can be a serializer, but it is not limited thereto.

The display module 301 includes a chip C1 and a first panel 350. After the chip C1 receives a second image signal from the converter 440, the chip C1 can output it to the first panel 350, and the first panel 350 can display according to the second image signal. The chip C1 can include a converter 310, a timing controller 334A, a micro controller unit 336A, and a touch unit 337A. The converter 310 receives the signal from the converter 440 and transmits it to the micro controller unit 336A, and the micro controller unit 336A transmits this signal to the first panel 350. The first panel 350 can display according to this signal. Furthermore, the micro controller unit 336A is electrically connected to the timing controller 334A and the touch unit 337A, so as to control the lightness, the color, and the touch of the first panel 350. In some embodiments, the chip C1 can be an integrated circuit (IC).

When the user is in contact with the first panel 350, the first panel 350 can transmit a touch signal to the touch controller 435A via the micro controller unit 336A and the touch unit 337A. The touch controller 435A can control the on-screen display indicator 432A according to the received touch signal to let the on-screen display indicator 432A changing the output on the on-screen display. The timing controller 434 can be electrically connected to the touch controller 435A and the micro controller unit 436A. The micro controller unit 436A can be electrically connected to the converter 410, so as to control the aforementioned members or assist the aforementioned members to calculate.

The display module 302 includes a chip C2 and a second panel 360. After the chip C2 receives a fourth image signal from the converter 450, the chip C2 can output it to the second panel 360, and the second panel 360 can display according to the fourth image signal. The chip C2 can include a converter 320, a timing controller 334B, a micro controller unit 336B, and a touch unit 337B. The converter 320 receives the signal from the converter 450 and transmits it to the micro controller unit 336B, and the micro controller unit 336B transmits this signal to the second panel 360. The second panel 360 can display according to this signal. Furthermore, the micro controller unit 336B is electrically connected to the timing controller 334B and the touch unit 337B, so as to control the lightness, the color, and the touch of the second panel 360. In some embodiments, the chip C2 can be an integrated circuit (IC).

The second panel 360 also includes touch function. When the user touches the second panel 360, the operation in the second panel 360 is the same as the aforementioned operation in the first panel 350, so that the features thereof are not repeated in the interest of brevity.

The memory 600 is electrically connected to the first chip 330, and the data of the automotive host computer 400 can be temporarily stored in the memory 600.

Figure 7:
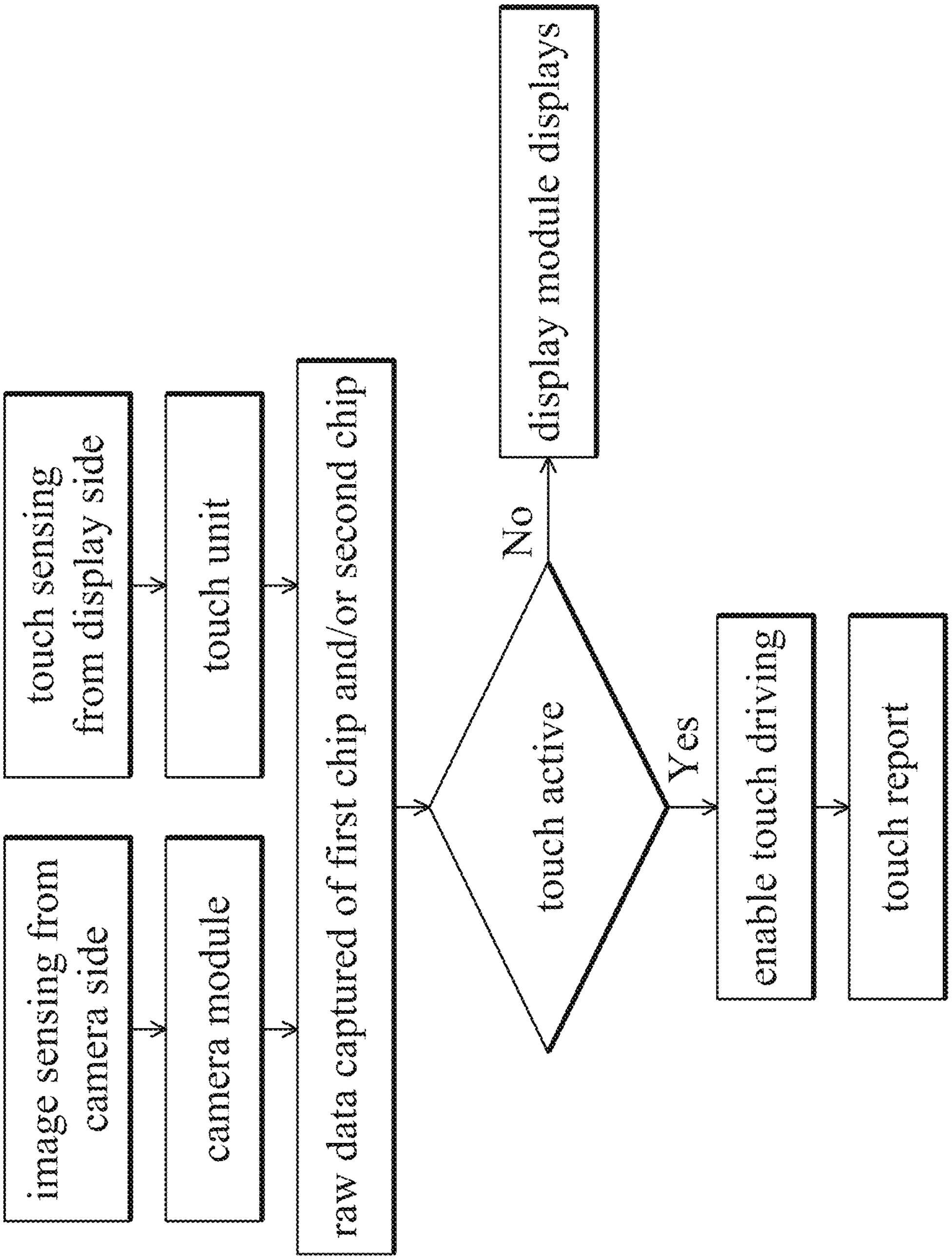
FIG. 7 is a flowchart diagram of the operation of the automotive device according to an embodiment of the disclosure.

The operation method of the automotive device according to the disclosure is discussed below. Referring to FIG. 7, the image sensing from the camera side can be captured by the camera module and transmitted to the chip (such as the chip in the display module or the chip in the automotive host computer), and the touch sensing from the display side can be captured by the touch unit of the display module and transmitted to the aforementioned chip. In other words, the first chip and/or the second chip can obtain the data from the both sides. When the touch is not active (i.e. there is no data of the touch sensing input in), the display module can be driven and directly display. When the touch is active, the touch can be driven and provides a touch report (for example, the on-screen display on the display module can be changed).

Figure 8:
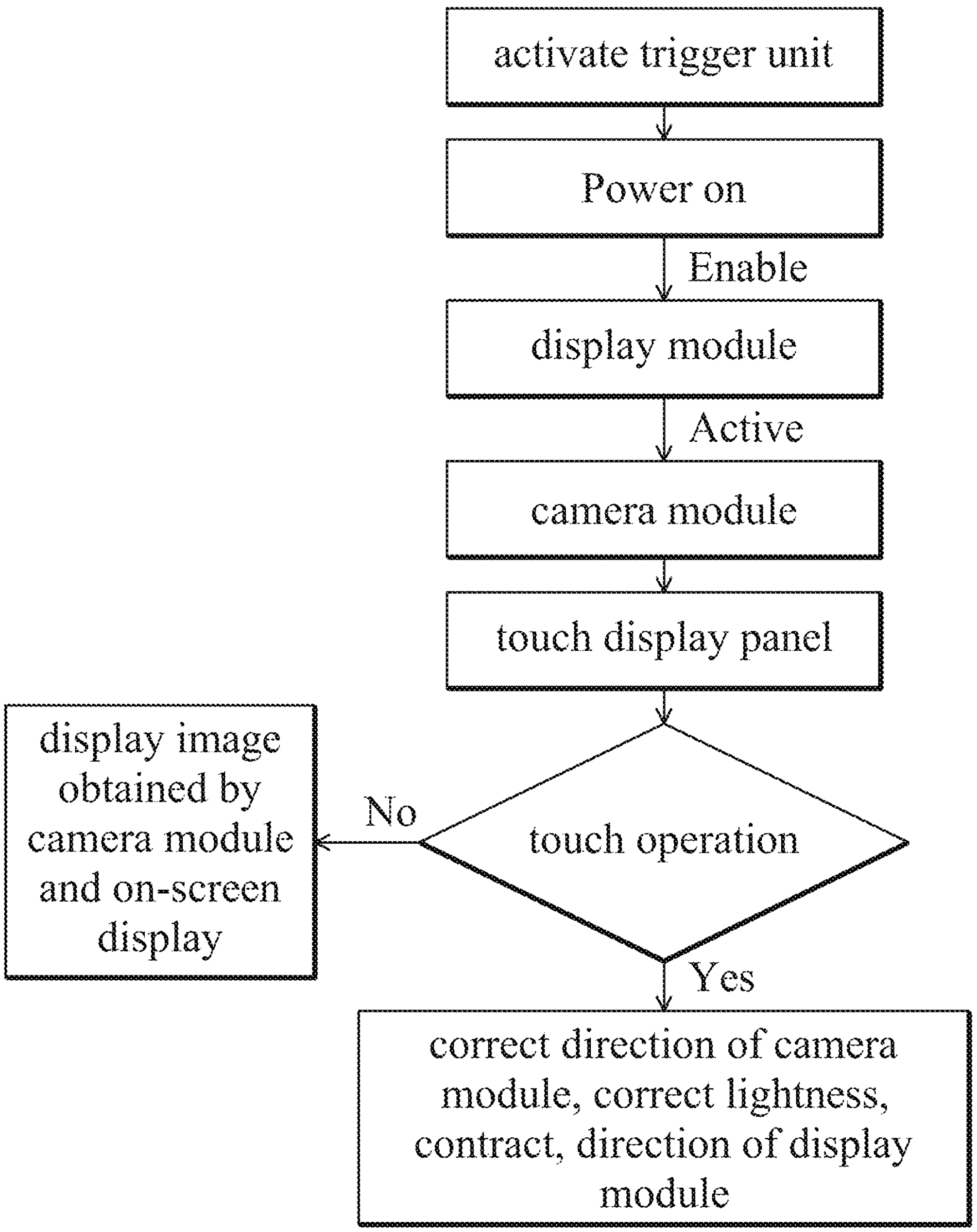
FIG. 8 is a flowchart diagram of the operation of the automotive device according to an embodiment of the disclosure.

Referring to FIG. 8, when the user uses the automotive device of the disclosure, he/she can firstly activate the trigger unit (such as unlocking the keyhole by the key, pushing the button, opening the switch, or let the corresponding sensing member moving adjacent to the sensor) to open the power of the automotive device. At this time, the activation of the display module (such as the electronic rear-view mirror) and the automotive host computer can be started simultaneously. The handling process of the display module is simpler, so that the state can be rapidly shown on the touch display panel (the first panel, the second panel, or both).

After the display module is activated, the camera module can be opened, and the image obtained by the camera module can be shown on the touch display panel. It should be noted that, in some embodiments, the display module and the automotive host computer can be activated independently (for example, by using two or more independent trigger members). Moreover, the display module and the automotive host computer can be synchronized with each other, but it is not limited thereto.

After that, the user can apply the touch operation on the touch display panel. When the user does not apply the touch operation, the touch display panel shows the image obtained by the camera module and the on-screen display. When the user touches the on-screen display on the touch display panel to apply the touch operation, the direction (the mechanical degree) of the camera module can be corrected. In some embodiments, the user can touch the on-screen display on the touch display panel to correct the lightness, the contrast, and/or the direction of the display panel.

Figure 9:
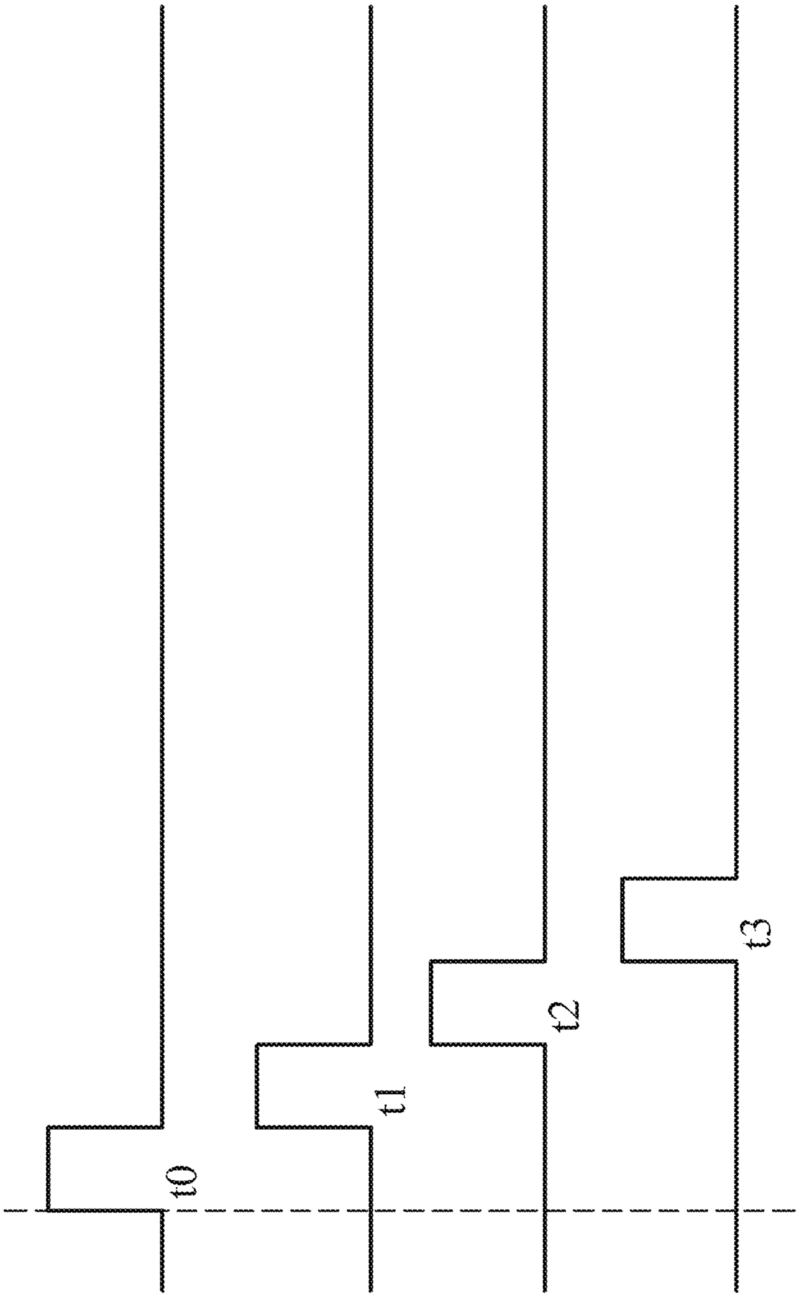
FIG. 9 is a timing diagram of the operation of the automotive device according to an embodiment of the disclosure.

Referring to FIG. 9, the user can activate the trigger unit at time to (such as unlocking the keyhole by the key, pushing the button, opening the switch, or let the corresponding sensing member moving adjacent to the sensor). Subsequently, the vehicle can start to activate the display module (such as the electronic rear-view mirror) and the automotive host computer at time t1. At time t2, the display module (for example, the electronic rear-view mirrors on the left side and the right side) can be firstly activated and the system state at this time can be determined (for example, determining that whether the system state is in regular). Finally, at time t3, the display module can show the combined image of the obtained image of the camera module and the on-screen display. It should be noted that, times t1, t2, and t3 represents that the actions are applied in sequence, and does not represents that the actions are applied continuously. For example, there can be an idle time between time t2 and time t3.

Figure 10:
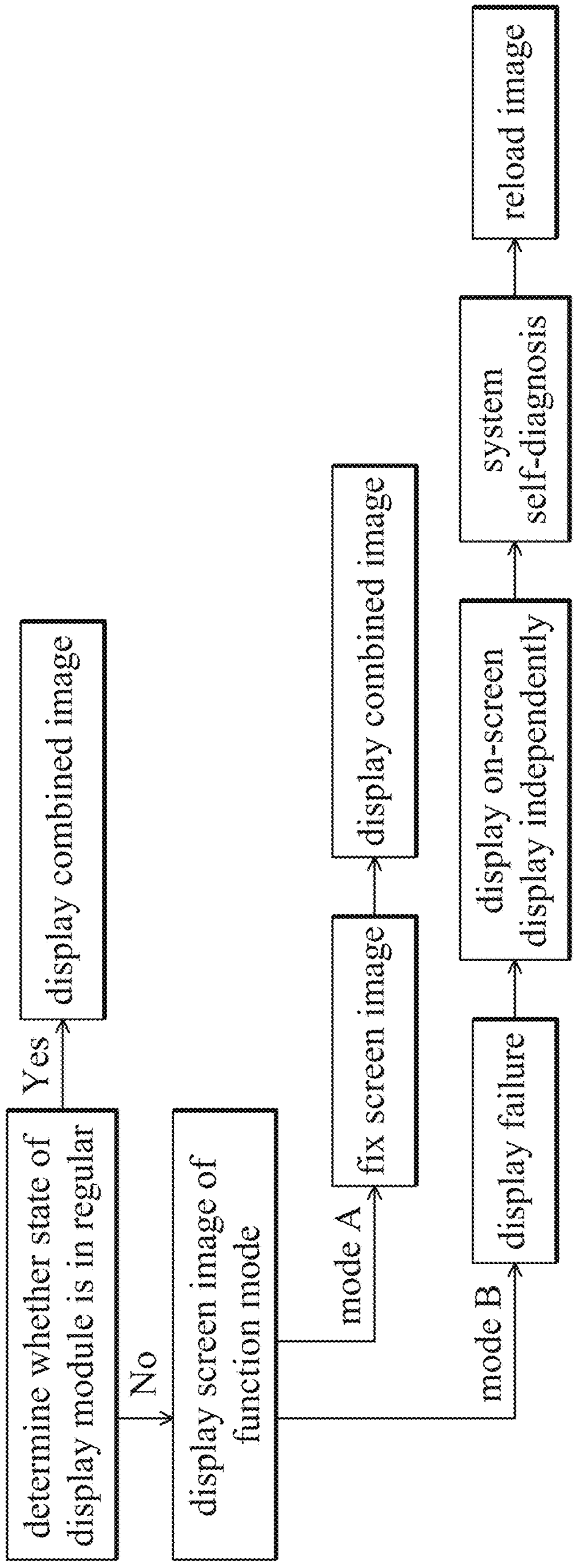
FIG. 10 is a flowchart diagram of the operation of the automotive device according to an embodiment of the disclosure.

Referring to FIG. 10, when the display module is activated, if the system of the automotive device determines the display module is in regular, the display module can show the combined image of the obtained image of the camera module and the on-screen display. If the system of the automotive device determines the display module is abnormal, the system can directly fix the screen image, and the display module can show the combined image after the fixture is completed (mode A). Otherwise, the display module can show that the failure is happened and merely show the on-screen display, the user can touch the option of the system diagnostic in the on-screen display to reload the image (mode B).

The features between the aforementioned embodiments can be used or combined as long as they do not violate or conflict the spirit of the present application.

In summary, an embodiment of the disclosure provides an automotive device, including camera module and a display module. The display module receives a first boot signal to activate itself. The display module includes a first panel. The first chip is configured to receive a first image signal from the camera module and output a second image signal to the first panel.

An embodiment of the disclosure also provides an operation method of an automotive device. The method includes transmitting a first boot signal to a display module to activate the display module. The method includes transmitting a first image signal (that is from a camera module) to a first chip. The method includes using the first chip to output a second image signal to a first panel of the display module after the first chip receives the first image signal. The method includes displaying an image on the first panel according to the second image signal.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An automotive device, comprising:

a camera module;

a display module, wherein the display module receives a first boot signal to activate the display module, and the display module has a first panel; and a first chip, disposed in the display module, and configured to receive a first image signal from the camera module and output a second image signal to the first panel;

an automotive host computer, wherein the automotive host computer receives a second boot signal to activate the automotive host computer, wherein when the display module and the automotive host computer simultaneously receive the first boot signal and the second boot signal, the display module is firstly actuated to display according to the second image signal via the first panel, wherein the automotive device further comprises an additional camera module, an additional display module, a second chip, and a busbar, the additional display module comprises a second panel, and the second chip is configured to receive a third image signal from the additional camera module and output a fourth image signal to the second panel, wherein the first chip is disposed in the display module, the second chip is disposed in the additional display module, and the first chip and the second chip are electrically connected to each other via the busbar, wherein the display module and the additional display module are synchronized with the automotive host computer via another busbar for transmitting signals therebetween.

2. The automotive device as claimed in claim 1, wherein the first boot signal is different from the second boot signal.

3. The automotive device as claimed in claim 2, wherein the first boot signal and the second boot signal are output simultaneously through a synchronous circuit.

4. The automotive device as claimed in claim 2, wherein the display module and the automotive host computer are synchronized with each other.

5. The automotive device as claimed in claim 1, wherein the first panel comprises a touch function adapted to transmit a touch signal to the first chip.

6. The automotive device as claimed in claim 5, wherein the first panel further displays an on-screen display (OSD), the touch function of the first panel corresponds to the on-screen display, the on-screen display is enabled to correct at least one of a lightness of the first panel, a contrast of the first panel, a direction of the first panel, and a direction of the camera module.

7. The automotive device as claimed in claim 1, wherein the display module further comprises a converter that is electrically connected to the camera module and the first chip, wherein the converter is configured to receive the first image signal, transform the first image signal into a digital signal, and then transmit the first image signal to the first chip.

8. The automotive device as claimed in claim 1, wherein the first chip comprises an on-screen display indicator and an image combiner, and the image combiner receives a first image signal from the camera module and an image signal of an on-screen display from the on-screen display indicator and combines them.

9. The automotive device as claimed in claim 8, wherein the first chip comprises a timing controller electrically connected to the image combiner.

10. The automotive device as claimed in claim 8, wherein the first chip comprises a touch controller electrically connected to the first panel and the on-screen display indicator, wherein in response to a touch on the first panel, the first panel transmits a touch signal to the touch controller, the touch controller controls the on-screen display indicator according to the touch signal, and the on-screen display indicator changes the output on the on-screen display.

11. The automotive device as claimed in claim 1, wherein the automotive device comprises a converter and an additional converter, the converter is electrically connected to the camera module and configured to receive the first image signal, and the additional converter is electrically connected to the display module and configured to output the second image signal.

12. The automotive device as claimed in claim 11, wherein the converter is a deserializer, and the additional converter is a serializer.

13. An operation method of an automotive device, comprising:

transmitting a first boot signal to a display module to activate the display module;

transmitting a first image signal that is from a camera module to a first chip, wherein the first chip is disposed in the display module;

transmitting a second boot signal to an automotive host computer to activate the automotive host computer, using the first chip to output a second image signal to a first panel of the display module after the first chip receives the first image signal;

when the display module and the automotive host computer simultaneously receive the first boot signal and the second boot signal, firstly actuating the display module, and displaying an image on the first panel according to the second image signal;

transmitting a third image signal that is from an additional camera module to a second chip;

using the second chip to output a fourth image signal to a second panel of an additional display module; and displaying an image on the second panel according to the fourth image signal, wherein the first chip is disposed in the display module, the second chip is disposed in the additional display module, and the first chip and the second chip are electrically connected to each other via a busbar, wherein the display module and the additional display module are synchronized with the automotive host computer via another busbar for transmitting signals therebetween.

14. The operation method of the automotive device as claimed in claim 13, wherein the first boot signal is different from the second boot signal.

15. The operation method of the automotive device as claimed in claim 14, wherein when the first boot signal is transmitted to the display module, the second boot signal is transmitted to the automotive host computer simultaneously.

16. The operation method of the automotive device as claimed in claim 15, wherein the display module is active before the automotive host computer is active.

17. The operation method of the automotive device as claimed in claim 13, further comprising:

the first panel displays the image according to the second image signal, and the first panel displays an on-screen display simultaneously.

18. The operation method of the automotive device as claimed in claim 17, further comprising:

touching the on-screen display on the first panel to correct at least one of a lightness of the first panel, a contrast of the first panel, a direction of the first panel, and a direction of the camera module.

19. The operation method of the automotive device as claimed in claim 13, further comprising:

after the display module is active, the first panel displays a system state of the display module.

* * * * *